United States Patent

[11] 3,583,817

| [72] | Inventors | Robert E. Rachlis<br>Freeport;<br>Richard H. Heimann, Flushing; Hugh M.<br>Monaghan, Bronx, all of, N.Y. |
|---|---|---|
| [21] | Appl. No. | 10,547 |
| [22] | Filed | Feb. 11, 1970 |
| [45] | Patented | June 8, 1971 |
| [73] | Assignee | Technicon Instruments Corporation<br>Tarrytown, N.Y. |

[54] COLORIMETER INCLUDING A FLOW CELL HAVING END WINDOWS
9 Claims, 7 Drawing Figs.

[52] U.S. Cl. ............................................. 356/181,
356/246, 250/218
[51] Int. Cl. ............................................. G01j 3/46,
G01n 1/10
[50] Field of Search ............................................. 356/181,
246; 250/218

[56] References Cited
UNITED STATES PATENTS

| 2,694,335 | 11/1954 | Albright, et al. | 356/181 |
| 3,236,602 | 2/1966 | Isreeli | 356/246X |
| 3,329,060 | 7/1967 | Holleran | 356/135 |
| 3,345,910 | 10/1967 | Rosin et al. | 356/181 |
| 3,493,306 | 2/1970 | Mayer | 356/246 |

Primary Examiner—Ronald L. Wibert
Assistant Examiner—T. Major
Attorneys—S. E. Rockwell and S. P. Tedesco ABSTRACT: A colorimeter including a flow cell having an open-ended tubular body providing a longitudinal sight passageway, intermediate a light source and a light detector for colorimetric analysis of a liquid sample within the passageway, the body having fluid inlet and outlet ports, one through the sidewall structure adjacent each end of the body. Light-permeable fluid seals are provided at the ends of the body, at least one of which has an inclined inner surface generally opposite one of the ports to minimize stagnant regions in the passageway. An optical element is provided to compensate for the refractive characteristics of the interface of the liquid with the aforementioned inclined surface, so that light passes from the source to the detector substantially axially of the passageway.

PATENTED JUN 8 1971

INVENTORS
ROBERT E. RACHLIS
RICHARD H. HEIMANN
HUGH M. MONAHAN

BY *Stephen E. Rockwell*
ATTORNEY ns
COLORIMETER INCLUDING A FLOW CELL HAVING END WINDOWS

BACKGROUND OF THE INVENTION

1. Field of the Invention

This invention relates to a colorimeter including a flow cell having end window seals, useful in continuous-flow analysis apparatus of the automated type.

2. Prior Art

Heretofore, colorimeter flow cells of tubular form with sight passageways including curved liquid inlet and outlet portions have been constructed by glassblowing or lamp-working techniques. Such a flow cell is disclosed in U.S. Pat. No. 3,241,432, issued Mar. 22, 1966. A flow cell formed in this manner has no sharp intersecting internal surfaces and such flow cells may exhibit good flow characteristics. Any particulate matter in the liquid stream, or any fine bubbles substantially smaller than the tube diameter, tend to be swept through the flow cell rather than buildup or collect therein. This is true though such sight passageways, say of approximately 9 to 19 mm. in length may be of relatively very small internal diameter, say for example approximately 1.5 mm., suitable for colorimetric analysis of very small volumes of liquid samples such as highly diluted human blood. However, the bent glass at the ends of such a passageway through which light is directed often fails to exhibit optimum optical qualities. For example, some light from the source may be absorbed in the end walls or refracted therefrom instead of passing substantially axially through the passageway. Optical problems have resulted in part because of lack of uniformity in the end walls of such a flow cell, and lack of uniformity of one cell with reference to another.

Attempts have been made to improve the optical qualities of flow cells by the construction of end windows for sight passageways which windows have been constructed and assembled so as to have their inner and outer surfaces parallel and lying in planes normal to the axis of the tubular body forming the sight passageway. When a path between a light source and a light detector is perpendicular to the interface of the liquid with each such window of a flow cell interposed in the light path, the direction of light through the sight passageway is substantially axial.

However, it has been found in the use of such windowed flow cells that stagnant regions tend to form in the sight passageway. Particulate foreign matter and very fine bubbles, considerably smaller than the passageway, tend to accumulate in these regions. It has been noted that this stagnation occurs particularly in the ends of the sight passageway, next to the windows. More specifically, it has been observed that dirt and small bubbles tend to collect at the bottoms of the windows. It is believed by some that this accumulation is at its greatest at the window nearest the liquid outlet from the sight passageway. Liquid in such analysis systems is normally pulsed, and when such pulsations occur in a windowed flow cell, such as described above, dirt and bubbles tend to spurt upwardly from the bottom of the sight passageway in a direction across the windows.

In the above-described manner, particulate foreign matter and small bubbles tend to obscure such a sight passageway, particularly the windows thereof. This results in what is known as optical noise in the signals transmitted from the flow cell to the light detector, which in turn effects a nonlinear affect in the operation of an analysis system such as that disclosed in aforementioned U.S. Pat. No. 3,241,432. In the quantitative analysis of fluid samples, whether liquid or gaseous, the measurement of the absorbance and/or transmittance characteristics of a fluid sample in a colorimeter flow cell is frequently utilized to determine the quantitative proportion of a constituent of interest.

SUMMARY OF THE INVENTION

It is an object of the invention to provide an improved flow cell of the windowed type, as opposed to the type having a bent glass fluid inlet and a bent glass fluid outlet at the respective ends of the cell within the light path from a light source to a light detector. A further object is to improve the flow characteristics of fluid within a flow cell of this type to reduce the tendency of dirt and fine bubbles to accumulate in the sight passageway of the flow cell, which accumulation tends to create optical noise in the manner described above. According to the invention, windows may be provided in a flow cell, which may be manufactured with extreme precision for greater uniformity as between windows and which windows exhibit excellent optical properties. Also, according to the invention the tubular body of the flow cell may be manufactured of black glass, the most important characteristic of which is, perhaps, that it very effectively tends to preclude the transmission within the sidewall structure of the body of light from the light source to the light detector. Black glass exhibits high light absorbance and its use in a flow cell body tends, among other things, to prevent ambient light from entering the sight passageway in the flow cell through the sidewall structure thereof.

Still further there is provided a windowed flow cell having at least one window thereof constructed as a liquid-sealing element located at one end of the passageway in the tubular body of the flow cell and having an inclined inner surface generally opposite the aforementioned corresponding port in the sidewall structure of the body, to minimize a stagnant region in the passageway adjacent the window in which dirt and fine bubbles might collect. This sloping surface of the window tends to refract light from the axis of the sight passageway, particularly owing to the fact that the fluid and the window have different indices of refraction. The invention provides optics which tend to compensate for any refraction at the interface of the fluid with the window, thereby inhibiting light from straying in a nonaxial direction from the aforementioned light path. This provides a vary sensitive flow cell exhibiting superior optical qualities.

DESCRIPTION OF THE PREFERRED EMBODIMENTS

Figure 1:
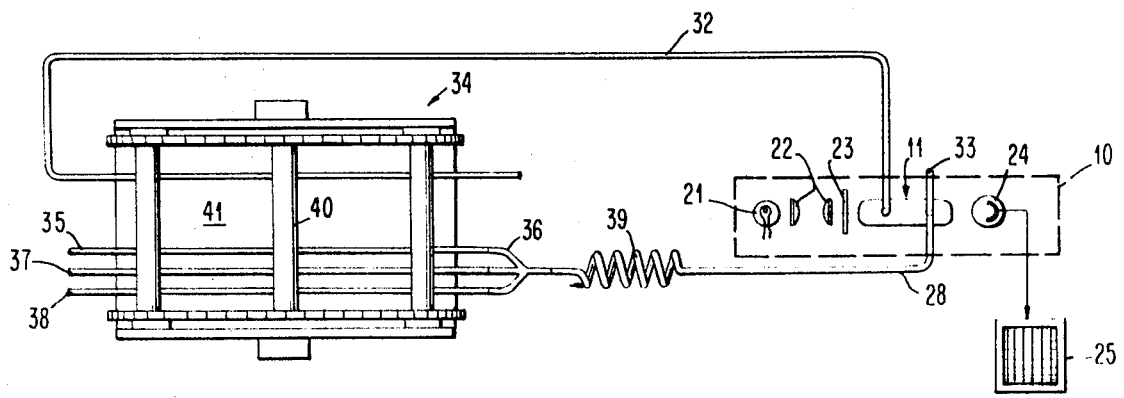
FIG. 1 is a diagrammatic view of apparatus for the treatment and colorimetric examination of a liquid stream including a colorimeter embodying the invention.
Figure 4:
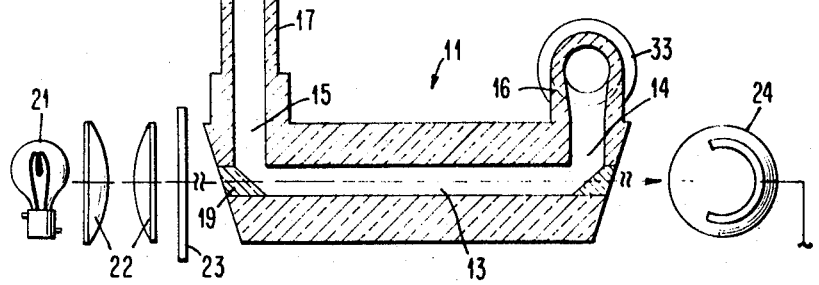
FIG. 4 is a broken elevational view illustrating certain elements of the colorimeter and showing the flow cell in median longitudinal section.

In FIG. 1, the colorimeter of the analytical apparatus is generally indicated at 10 and the flow cell at 11. The flow cell of the form of FIGS. 1—4 includes in the usual orientation of the apparatus a horizontal tubular member 12 of a material which, while the invention is not limited thereto, is preferably formed of black glass which may be of Corning type 9322. If desired, the tubular member may be formed of clear glass. The member 12 has a smooth axial bore 13 open at both ends, which constitutes a sight passageway. As best shown in FIG. 4 the member 12 has a fluid inlet or port 14 adjacent one end thereof extending through the sidewall structure communicating with the bore 13, and has a similar outlet or port 15 adjacent the other end thereof. It will be seen that the ports 14 and 15 enter into the bore or passageway 13 through the top of the latter. However, the port 14, for example, could be constructed to open into one side of the passageway 13 if desired. Connected to the port 14 is a tubular portion 16 which may be formed of a suitable clear glass. Connected to the port 15 is a similar tubular portion 17. The tubular portions 16 and 17 may be fused to the tubular member 12.

Light permeable end windows or seals 18 and 19 close the ends of the bore 13 in the member 12. These windows which may be formed of a suitable clear glass are in the form of plugs and are sealed in the ends of the bore 13 as by fusing. In the form being described, at least one of the aforementioned windows has a sloping surface and as illustrated both have such surfaces indicated at 20. The inclination may vary within an few degrees but from a practical standpoint with reference to the assembly of the windows, it has been found that the angle should approximate 45°. It will be noted that these inclined window surfaces are generally opposite the corresponding ports 14 and 15 in the tubular member. It should also be noted that the inclined surface 20 of the window 18 would remain generally opposite the port 14 if the latter extended into the passageway 13 from the side thereof rather than the top. These inclined window surfaces tend to produce a laminar flow of fluid through the passageway 13 without the creation of stagnant regions in which dirt and fine bubbles might collect to create optical noise.

It will be understood that the fluid passage in the tubular member 12 of the cell is defined by the wall of the bore 13 and extends between the end windows 18 and 19 as best shown in FIG. 4. As shown in the last-mentioned view, there is provided the usual colorimeter light source 21 in the form of a bulb, focusing lenses 22 and a filter 23, and a light detector 24 at the end of the flow cell remote from the light source 21. The arrangement is such that light is focused in the passageway 13 of the flow cell so that it passes therealong to the light detector 24 which operates in the usual manner a recorder 25 (FIG. 1) that records the light transmittance or absorbance characteristics of the fluid as an indication of the concentration of a particular known constituent of the fluid under colorimetric examination.

Figure 2:
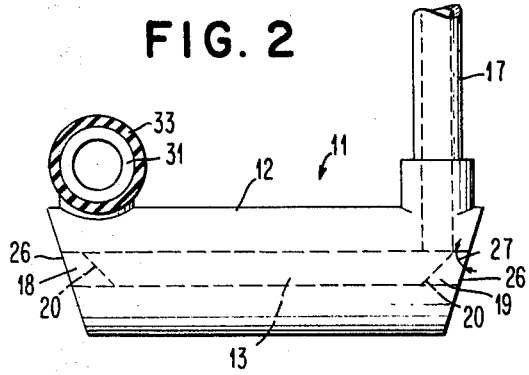
FIG. 2 is a fragmentary view on a greatly enlarged scale illustrating in side elevation the flow cell of the colorimeter.
Figure 3:
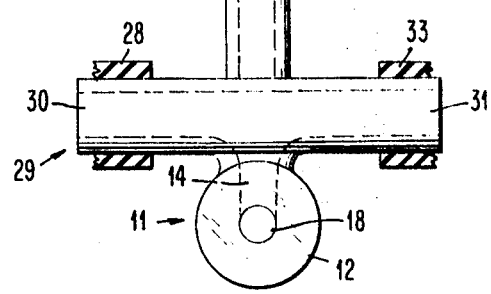
FIG. 3 is a view similar to FIG. 2 but illustrating one end of the flow cell.

The fluid under examination may be a liquid having an index of refraction which may be considered to be that of water and, hence, different from the glass of the end windows of the flow cell. As both windows are shown as having a liquid-glass interface at 45° to the axis of the sight passageway, compensation must be made for refraction at this interface which would tend to bend light from the light path away from the axis of the sight passageway. In the form being discussed, the compensation is made for each window having an inner surface inclined at 45° by slanting the external surface 26 thereof at an angle required for refraction correction of approximately 73.6°, indicated at 27 (FIG. 2).

This may be expeditiously accomplished after assembly and fusing of the sealing members 18 and 19 in the ends of the bore 13 of the flow cell, by grinding off the window plugs and the respective ends of the tubular member 12 at the desired angle, previously indicated to be 73.6°, so that the end windows are flush with the ends of the tubular member 12 and the windows are as thin as possible. Thinness of the windows tends to prevent vignetting of light within the windows. When the light-permeable end seals or windows of the flow cell are structured in this manner light from the source 21 to the detector 24 is effectively controlled so as to pass substantially axially through the bore or sight passageway 13 in the tubular member of the flow cell.

In use of the apparatus for the colorimetric examination of a liquid, the liquid is pumped through a tube 28 having its outlet end connected to tubular member 29 (FIG. 3) at the inlet end 30 of the latter. It is debubbled at the junction of the member 29 with the tubular portion 16 through which liquid, substantially free of bubbles, passes downwardly, while bubbles pass through the outlet end 31 of the tubular member 29. A small quantity of liquid is incidentally also removed concurrently with the removal of the bubbles but the major portion of the liquid passes through the tubular portion 16. Liquid flowing down the tubular portion 16 enters the inlet port 14 and fills the sight passageway 13, passing in a horizontal direction, and against the direction of the passage of light through the flow cell, in the form illustrated by way of example. It then flows upwardly into the tubular portion 17 through outlet port 15, and into suction tube 32 having its inlet connected to the tubular portion 17. The outlet end 31 of tubular member 29 is connected to the inlet end of a tube 33 (FIG. 3) which may have its outlet end, not shown, connected to waste or to some other receptacle, as required or desired.

Referring now to FIG. 1, there is shown a colorimetric analysis apparatus of the type which is disclosed in U.S. Pat. No. 3,797,149, issued June 25, 1957, and which may utilize the flow cell and associated apparatus of the present invention. The analysis apparatus includes a proportioning pump 34. The sample liquid which is to be treated for colorimetric analysis is transmitted in the form of a stream through a pump tube 35 to a fitting 36 where it joins a stream of air or other inert gas and a stream of a color-producing reagent transmitted through pump tubes 37 and 38, respectively.

The fluids join each other in fitting 36 and form a segmented stream consisting of a series of liquid segments each containing a portion of the sample liquid and a portion of the color reagent. As indicated in the aforementioned U.S. Pat. No. 2,797,149, the gas segments help cleanse the internal walls of the tubular passages of the apparatus. They also serve to separate one sample from another. The constituents of each liquid segment are mixed together in a horizontal mixing coil 39 and are transitted from the mixing coil to the tubular member 29, shown in FIG. 3, through the tube 28. The aforementioned suction tube 32 connected to the tubular portion 17 of the flow cell is directed through the pump 34 as shown.

The proportioning pump 34, which is schematically illustrated, may be of the type shown in U.S. Pat. No. 2,935,028, issued May 3, 1960. Briefly described, the pump comprises a plurality of resilient flexible pump tubes which are compressed along their lengths for the pumping operation by the engagement therewith of a plurality of pressure rollers, one such roller being indicated at 40. The pressure rollers move longitudinally of the pump tubes to fully close said tubes progressively along their lengths against the platen 41 and thus propel the liquids or other fluids for transmitting them from sources of supply to points of delivery.

Figure 5:
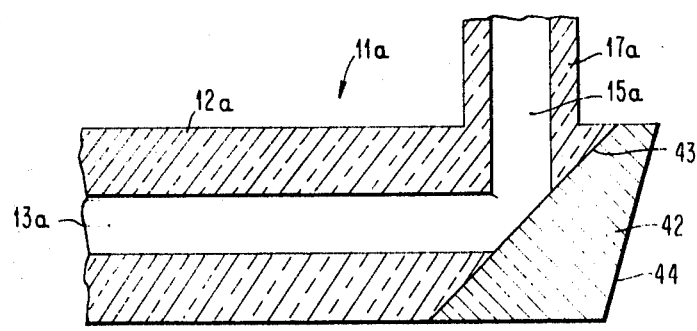
FIG. 5 is a fragmentary elevational view, similar to FIG. 4, illustrating a modified form of the flow cell in longitudinal median section.

In the modified form of FIG. 5, only the construction of one end portion of the flow cell 11a is shown for the sake of convenience. It should be appreciated that the other end portion of the flow cell may be similarly structured. The flow cell comprises a tubular member 12a similar to tubular member 12 previously described and having a longitudinal bore 13a therein providing a sight passageway in communication with an outlet port 15a in the member 12a and connected to a tubular portion 17a generally similar to the tubular portion 17 previously described. It will be noted that the outlet port 15a and the bore 13a intersect at one sloping end of the tubular member 12a.

A light permeable sealing element or window 42 in the form of an end cap for the tubular member 12a closes the corresponding end of the bore 13a in the manner shown in the last-mentioned view. The sealing element or window 42 has a complementally formed inner surface 43 which abuts and is sealed to, as by cementing, the last-mentioned end of the tubular member 12a. As shown, the surface 43 is formed on an angle of approximately 45° to the axis of the sight passageway 13a of the flow cell. The surface 43 of the end cap, which closes the last-mentioned end of the bore 13a has the same function and characteristics similar to the surface 20 of the above-described sealing element 19.

The outer surface 44 of the window 42 has the same slant and similar function and characteristics as the surface 26 of the above-described window 19. It has been found that in the use of the flow cell of FIG. 5, there is greater transmission of light through the window than in the form previously described and, also, less vignetting than in the form of FIG. 6 to be described, because of the larger outer window surface area. It will be noted that the cap 42 has a diameter similar to that of the tubular member 12a. The arrangement of the flow cell 11a with reference to the other above-described components of the colorimeter is the same as that of the flow cell 11.

Figure 6:
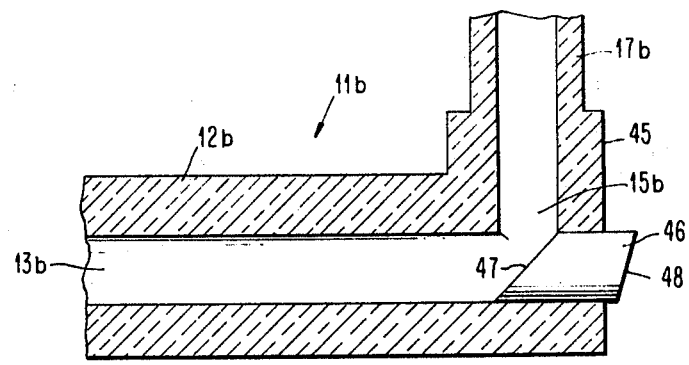
FIG. 6 is a view similar to FIG. 5, showing a further modification.

In modified form of FIG. 6, only the construction of one end portion of the flow cell 11b is shown for the sake of convenience. It should be appreciated that the other end portion of the flow cell may be similarly structured. The flow cell comprises a tubular member 12b similar to the tubular member 12 and having a longitudinal bore 13b therein providing a sight passageway. This is in communication with an outlet port 15b in the member 12b and connected to a tubular portion 17b generally similar to the tubular portion 17 previously described. It will be noted that the illustrated end of the member 12b is squared off as at 45.

A light permeable sealing element or window 46 in the form of an end plug for the tubular member 12b closes the corresponding end of the bore 13b in the manner shown in the last-mentioned view. The plug also protrudes from the last-mentioned member in the manner shown and may be fused thereto to provide a fluid seal. The window 46 has an inner surface 47 formed on an angle of approximately 45° to the axis of the sight passageway 13b of the flow cell, and this surface has the same function and characteristics similar to the surface 20 of the above-described sealing element 19.

The outer surface 48 of the window 46 has the same slant and similar function and characteristics as the surface 26 of the above-described window 19. It will be noted that the window 46 is of substantially greater thickness than the window 19. The arrangement of the flow cell 11b with reference to the above-described components of the colorimeter is the same as that of the flow cell 11.

Figure 7:
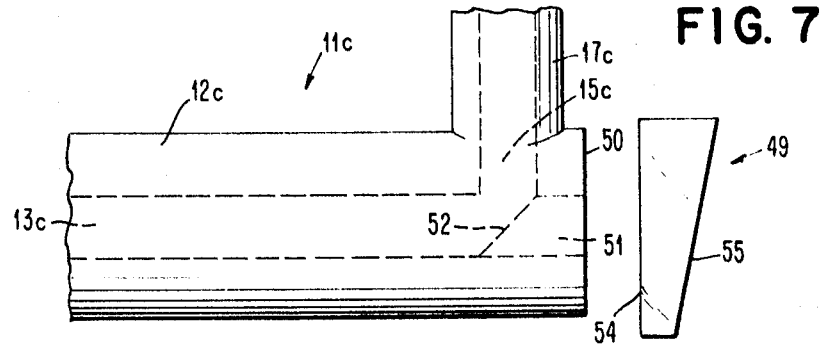
FIG. 7 is a fragmentary view in side elevation illustrating a flow cell of still another form and a prism in association therewith.

In the modified form of FIG. 7, only the construction of one end portion of flow cell 11c with its associated prism 49 is shown for the sake of convenience. It should be appreciated that the other end portion of the flow cell may be similarly structured and associated with a similar prism. The flow cell comprises a tubular member 12c similar to the tubular member 12 previously described, and having a longitudinal bore 13c therein providing a sight passageway. This is in communication with an outlet port 15c in the member 12c and connected to a tubular portion 17c generally similar to the portion 17 previously described. It will be noted that the illustrated end of the tubular member 12c is squared off as at 50.

A light-permeable sealing element or window 51 in the form of an end plug closes the corresponding end of the bore 13c in the manner shown in the last-mentioned view. The sealing element or window 51 has an inclined inner surface 52 formed on an angle of approximately 45° to the axis of the sight passageway 13c of the flow cell. The surface 52 of the window 51 has the same function and characteristics similar to the surface 20 of the above-described sealing element 19.

The outer surface of the window 51 may be flush with the end 50 of the tubular member 12c and lie in a plane normal to the axis of the sight passageway 13c. It will be obvious from the foregoing that the window surface lying in the last-mentioned plane does not compensate for refraction of light in the light path at the interface of the fluid in the flow cell with the window surface 52. Hence, other means must be employed to make the necessary compensation. In the form being discussed the prism 49 serves this purpose.

As shown, the face 54 of the prism nearest the flow cell 11c, but spaced therefrom, in the form illustrated by way of example, lies in a plane normal to the axis of the sight passageway 13c. The obverse face 55 of the prism lies in a plane with reference to the axis of the sight passageway at an angle of approximately 73.6°. The prism 49 structured in this manner corrects the aforementioned refraction. It will be understood that the prism is located intermediate the last-mentioned end of the flow cell 11c and the light source of the colorimeter. The arrangement of the flow cell 11c with reference to the other above-described components of the colorimeter is the same as that of the flow cell 11.

What I claim is:

1. A colorimeter including a flow cell for location intermediate a light source and a light detector for measurement of light absorbance of a fluid therein, comprising: a linear tubular flow cell member having fluid inlet and outlet ports for fluid flow through said member, one of said ports being connected to the tubular member adjacent each end of said member, said member also defining a longitudinal optical path therethrough, and transparent elements providing fluid seals at the ends of the tubular member, each of said transparent sealing elements having an inner planar surface and an outer planar surface, said inner surface of each of said elements being generally opposite one of said ports in the fluid path and being inclined with reference to the axis of the tubular member so as to tend to minimize stagnation in the passageway in the region adjacent the sealing element, the inclined surfaces refracting light in a direction away from said optical path of said tubular member, and said outer surfaces of said elements being inclined with reference to said optical path to refract said light in a direction to compensate for refraction caused by said inner surfaces.

2. A colorimeter as defined in claim 1, wherein said ports are located above said inner inclined surfaces.

3. A colorimeter as defined in claim 1, wherein said tubular member is formed of black glass.

4. A colorimeter as defined in claim 1, wherein each of said sealing elements having an inclined inner surface is in the form of a plug extending into the tubular member.

5. A colorimeter as defined in claim 1 wherein each of said sealing elements having an inclined inner surface is in the form of a plug flush with the corresponding end of said tubular member.

6. A colorimeter as defined in claim 1, wherein each of said sealing elements having an inclined inner surface is in the form of a plug protruding from the respective outer end of said tubular member.

7. A colorimeter as defined in claim 1 wherein each of said sealing elements having an inclined inner surface is in the form of an end cap, the last-mentioned surface mating with a complementally inclined surface of the corresponding end of the tubular member.

8. In a flow cell for a colorimeter having a light source and a light detector between which there is a substantially straight light path, the combination of a linear tubular flow cell member having fluid inlet and outlet ports for fluid flow through said member, one of said ports being connected to the tubular member adjacent each end of the member, said member also defining a longitudinal optical path therethrough for alignment with said optical path, and transparent elements providing fluid seals at the ends of the tubular member, each of said transparent sealing elements having an inner planar surface and an outer planar surface, said inner surface of each of said elements being generally opposite one of said ports and in the fluid path and being inclined with reference to the axis of the tubular member so as to tend to minimize stagnation in the passageway in the region adjacent the sealing element, the inclined surfaces refracting light in a direction away from said optical path of said tubular member, and said outer surfaces of said elements being inclined with reference to said optical path to refract said light in a direction to compensate for refraction caused by said inner surfaces.

9. A flow cell as defined in claim 8, wherein said tubular member is formed of black glass.